(No Model.)
H. G. LOCKE.
Hop Picking Machine.
No. 238,409. Patented March 1, 1881.
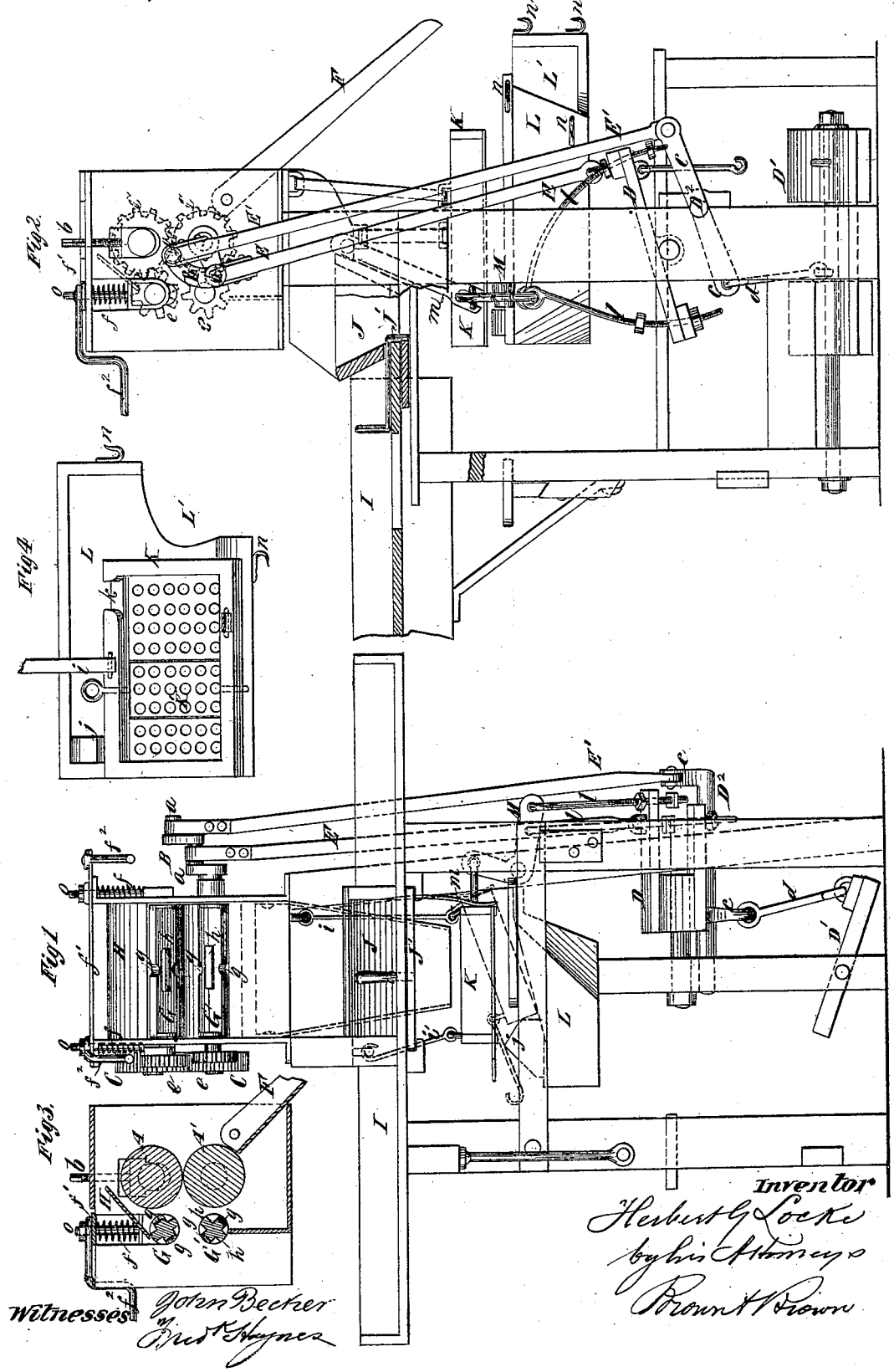
Witnesses
John Becker
Fred K. Haynes
Inventor
Herbert G. Locke
by his Attorneys
Brown & Brown

UNITED STATES PATENT OFFICE.

HERBERT G. LOCKE, OF WEST WINFIELD, NEW YORK.

HOP-PICKING MACHINE.

SPECIFICATION forming part of Letters Patent No. 238,409, dated March 1, 1881.

Application filed June 2, 1880. (No model.)

*To all whom it may concern:*

Be it known that I, HERBERT G. LOCKE, of West Winfield, in the county of Herkimer and State of New York, have invented certain new and useful Improvements in Machines for Picking Hops, of which the following is a specification.

My invention relates to hop-picking machines in which are employed drawing-rollers for feeding the vines through the machine, and stripping rollers or devices for picking, stripping, or detaching the hops from the vines.

My invention consists in the combination, with a pair of drawing-rollers, of rotary stripping rollers or devices of peculiar construction.

It also consists in the combination, with the stripping rollers or devices placed one above the other, of yielding bearings for one roller or device, and a novel arrangement of devices for lifting the upper roller or device.

It also consists in the combination, with the drawing-rollers and stripping rollers or devices, of a novel construction and arrangement of devices for separating the large from the small hops, and for facilitating the removal of vines and leaves which may be collected in the separator with the hops.

It also consists in the combination, with a sieve which forms part of the separating devices, of a novel arrangement of mechanism for shaking said sieve, and in various details of construction, to be hereinafter described.

In the accompanying drawings, Figure 1 represents a front view of a machine embodying my invention. Fig. 2 represents a side view thereof, partly in section. Fig. 3 represents a detail sectional view of the drawing-rollers and stripping devices, and Fig. 4 represents a detail plan of certain portions of the separating devices.

Similar letters of reference designate corresponding parts in all the figures.

A A' designate two drawing-rollers which produce the feed of the hop-vines through the machine. These rollers are preferably rubber-surfaced, and in this example of my invention are rotated by means of a double crank, B, attached to the roller A', the crank-pins $a$ of which are set at an angle of about ninety degrees (90°) with the shaft of the roller and each other. The roller A' is supported in fixed bearings, while the roller A is supported in movable bearings, and may be adjusted toward or from the other roller by screws $b$. (See Fig. 2.) The rollers A A' are geared together by spur-wheels C upon their shafts, and motion is imparted to them through two treadles, D D', acting through rods E E'. The rod E is connected directly to the treadle D, but the rod E' is connected to the treadle D' through a rock-shaft, $D^2$, having arms $c$, to one of which the rod E' is connected, while the other is connected with the treadle D' by a link, $d$.

F designates a chute for guiding the vines as they issue from between the rollers A A'.

G G' designate the stripping devices, arranged in front of the rollers A A', and deriving motion, through spur-pinions $e\ e$, from the spur-wheels C, which therefore produce a rotation of the stripping devices in a direction opposite to that of the drawing-rollers. The upper stripping device, G, is supported in bearings which are pressed down by springs $f$. The rods $o$, which support the bearings, are connected by a cross-bar, $f'$, and $f^2$ designates arms or levers extending therefrom. By pressing down upon said arms or levers, one edge of the cross-bar $f'$ forms a fulcrum upon which the bearings and the stripping device G are raised. The stripping devices are represented as of the form of rollers flattened or cut away on opposite sides, and having peripherical grooves or notches $g$ in their rounded edges, and projecting angular lugs or pieces $h$ upon their flat sides. The vine is received and guided in the notches $g$, and the hops are stripped therefrom by the angular pieces or lugs $h$, which constitute strippers.

H designates a guard or scraper, by which the hops are prevented from being carried around the upper stripping device, G.

I designates a table or platform, from which the hop-vines are fed into the machine, and J designates a hopper, in which the hops are received after being stripped from the vines. This hopper is closed by a slide or gate, J', and after a suitable quantity of hops is deposited therein the slide is opened and the hops dropped into a separator. This separator is composed of a swinging or oscillating sieve, K, and a box, tray, or receptacle, L, into which the hops are delivered from said sieve, and from which they are removed into bags. The sieve K is suspended by rods or straps $i$ $i'$, and when desired the rod or strap $i'$ may be unhooked and the sieve dropped into a notch, $j$, in the edge of the box or trap L, as shown in dotted outline in Fig. 1, and its oscillation is thereby prevented. The bottom of the sieve K is perforated, to permit the small hops to pass through, as the sieve is oscillated, into the box or tray L, and is provided with a hinged portion or trap, K', which may be opened to drop all the hops contained in the sieve into the box or tray. Leaves or pieces of vine which may drop into the sieve K with the hops are removed by hand, and a notch, $k$, is provided in the edge of the box or tray to facilitate the removal of long vines.

The mechanism here shown for imparting an oscillating motion to the sieve K consists of a bell-crank lever, M, which receives motion from the treadle D through rods $l$, and a spring, $m$, is preferably employed to give the sieve a quick movement or impulse.

The box or tray L is cut away at one corner, L', and furnished with hooks $n$, to provide for connecting a bag thereto.

In lieu of treadles for imparting motion to the machine, other means might be employed.

By my invention I provide a machine by which hops may be quickly and easily stripped from the vines with a small expenditure of power, and by which they may be readily cleaned and separated.

What I claim as my invention, and desire to secure by Letters Patent, is—

1. The combination, in a hop-picking machine, with a pair of drawing-rollers and mechanism for operating them, of a pair of rotary stripping devices having the peripherical grooves $g$ and the strippers $h$, substantially as specified.

2. The combination of the stripping device G', arranged in fixed bearings, the stripping device G, arranged in movable bearings, the rods $o$, cross-bar $f'$, and levers $f^2$, substantially as specified.

3. The combination, in a hop-picking machine, of two drawing-rollers and mechanism for operating them, two stripping rollers or devices, a hopper in which the hops are received, provided with a gate, and a shaking-sieve into which the hops are delivered from the hopper, substantially as specified.

4. The combination, in a hop-picking machine, of two drawing-rollers, two stripping rollers or devices, and a sieve having in its bottom a hinged portion through which the contents thereof may be discharged, substantially as specified.

5. The combination, in a hop-picking machine, of two drawing-rollers, two stripping rollers or devices, a crank upon the shaft of one of said drawing-rollers, a treadle and rod for operating said crank, a sieve suspended by straps or rods, and a bell-crank lever, one arm of which is connected to the sieve and the other to the treadle, whereby a shaking motion is imparted to the sieve, substantially as specified.

6. The combination of the sieve K, suspending rods or straps $i$ $i'$, one of which may be unhooked, and the tray or box L, having in it a notch, $j$, for the reception of the sieve, substantially as and for the purpose specified.

7. The combination of the drawing-rollers A A', the stripping rollers or devices G G', the double crank B, the treadles D D', the rod E, connected to the treadle D, and the rock-shaft $D^2$, having arms $c$ $c$, to one of which the rod E' is connected, and to the other of which the treadle D' is connected, substantially as specified.

HERBERT G. LOCKE.

Witnesses:
A. B. HAGGERTY,
W. H. PARKHURST.